(12) United States Patent
Xu

(10) Patent No.: US 10,778,887 B1
(45) Date of Patent: Sep. 15, 2020

(54) SECURITY APPLICATION USING CAMERA SOC WITH MULTI-SENSOR CAPABILITIES

(71) Applicant: Ambarella International LP, Santa Clara, CA (US)

(72) Inventor: Ruian Xu, San Jose, CA (US)

(73) Assignee: Ambarella International LP, Santa Clara, CA (US)

( * ) Notice: Subject to any disclaimer, the term of this patent is extended or adjusted under 35 U.S.C. 154(b) by 0 days.

(21) Appl. No.: 16/426,278

(22) Filed: May 30, 2019

(51) Int. Cl.
  *H04N 5/225* (2006.01)
  *H04N 5/232* (2006.01)
  *H04N 5/33* (2006.01)

(52) U.S. Cl.
  CPC ....... *H04N 5/23219* (2013.01); *H04N 5/2253* (2013.01); *H04N 5/2254* (2013.01); *H04N 5/2259* (2013.01); *H04N 5/33* (2013.01)

(58) Field of Classification Search
  CPC .............................................. G08B 13/19645
  See application file for complete search history.

(56) References Cited

U.S. PATENT DOCUMENTS

2004/0252194 A1* 12/2004 Lin ..................... H04N 7/181
                                                                        348/169
2006/0250501 A1* 11/2006 Widmann ........ G08B 13/19647
                                                                        348/148
2015/0022630 A1*  1/2015 Shafir ..................... H04N 5/77
                                                                        348/38
2018/0343772 A1* 11/2018 Raghupathy ........... F16M 13/00
2019/0154871 A1*  5/2019 Leduc .................... B62D 63/02

FOREIGN PATENT DOCUMENTS

EP         2011093 B1 *  6/2018    ....... G08B 13/19695

* cited by examiner

*Primary Examiner* — Peet Dhillon

(74) *Attorney, Agent, or Firm* — Christopher P. Maiorana, PC

(57) ABSTRACT

An apparatus includes a first lens and first image sensor, a second lens and second image sensor, a first motion sensor, a second motion sensor, and a processor. The first image sensor may be configured to capture a first video image stream of a first field of view (FOV). The second image sensor may be configured to capture a second video image stream of a second FOV. The first motion sensor may be configured to detect motion in the first FOV. The second motion sensor may be configured to detect motion in the second FOV. The processor is generally coupled to the first image sensor, the first motion sensor, the second image sensor, and the second motion sensor, and configured to generate a third video image stream in response to one or more of the first video image stream and the second video image stream.

20 Claims, 8 Drawing Sheets

SECURITY APPLICATION USING CAMERA SOC WITH MULTI-SENSOR CAPABILITIES

FIELD OF THE INVENTION

The invention relates to security cameras generally and, more particularly, to a method and/or apparatus for implementing a security application using a camera system on chip (SOC) with multi-sensor capabilities.

BACKGROUND

Home security systems often utilize two cameras to watch corner locations such as a driveway and a side-yard, or a driveway and a front-door pathway. The two cameras record the two areas separately (in two video files). When someone walks from the driveway to the side-yard or the front door, tracking the movement requires switching between the two video files. For consumers, purchasing and installing two independent cameras to cover such locations (i.e., corners), in order to watch for activities from two directions, is expensive and tedious. Currently, some camera manufacturers have been looking for ways to have two cameras inter-connected and predict what will happen so that the main camera activates the secondary camera ahead of time. Besides the cost of the second camera, it can be difficult to install and get the two independent cameras to interact accurately.

It would be desirable to implement a security application using a camera system on chip (SOC) with multi-sensor capabilities.

SUMMARY

The invention concerns an apparatus including a first lens and first image sensor, a second lens and second image sensor, a first motion sensor, a second motion sensor, and a processor. The first lens and first image sensor may be configured to capture a first video image stream of a first field of view (FOV). The second lens and second image sensor may be configured to capture a second video image stream of a second FOV. The first motion sensor may be configured to detect motion in the first field of view (FOV). The second motion sensor may be configured to detect motion in the second field of view (FOV). The processor is generally coupled to the first image sensor, the first motion sensor, the second image sensor, and the second motion sensor, and configured to generate a third video image stream in response to one or more of the first video image stream and the second video image stream.

BRIEF DESCRIPTION OF THE FIGURES

Embodiments of the invention will be apparent from the following detailed description and the appended claims and drawings in which:

DETAILED DESCRIPTION OF THE EMBODIMENTS

Figure 1:
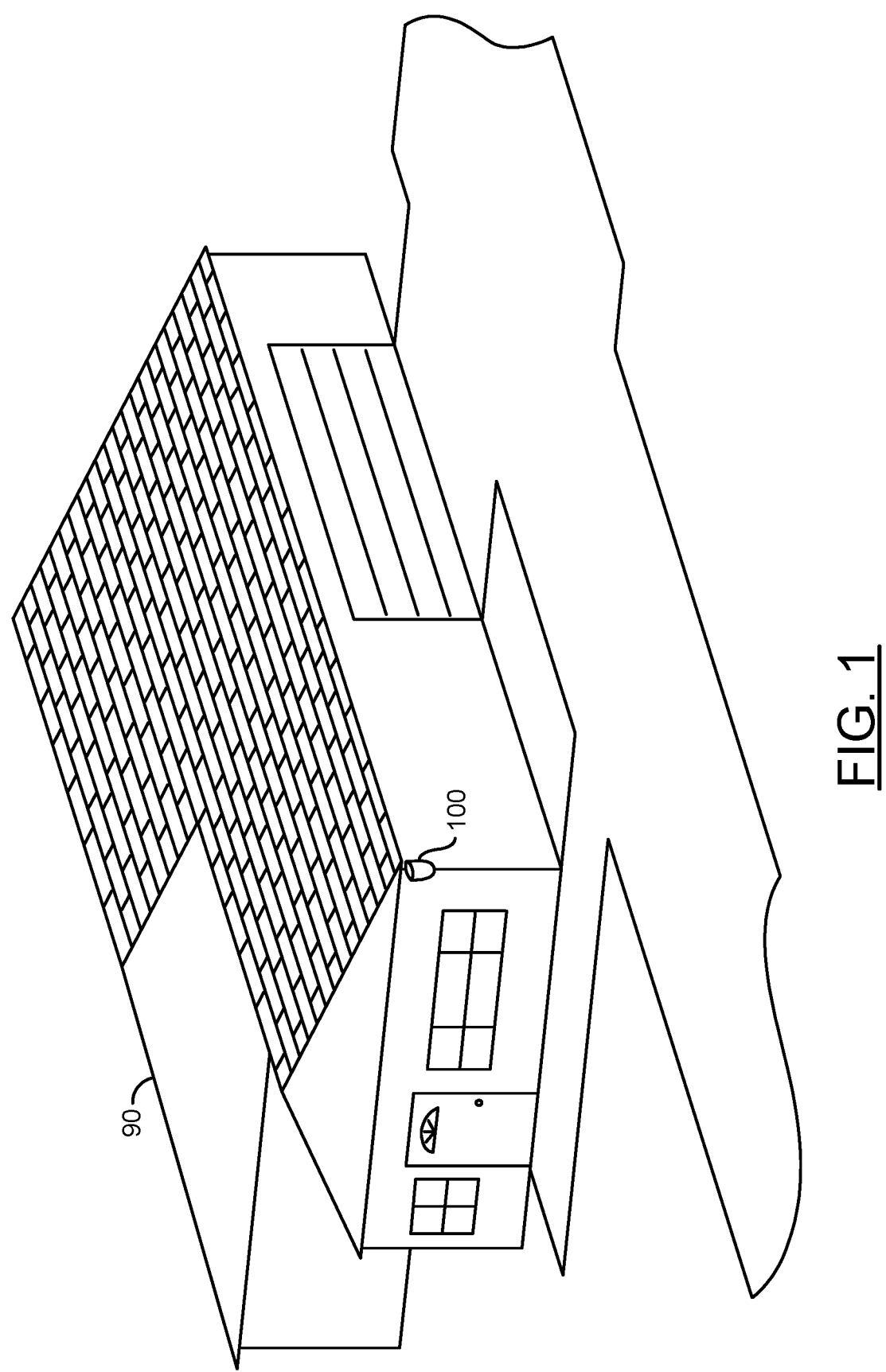
FIG. 1 is a diagram illustrating a context of an example embodiment of the invention.

Embodiments of the present invention include providing a security application using a camera system on chip (SOC) with multi-sensor capabilities that may (i) be used in corner surveillance applications, (ii) reduce cost, (iii) connect multiple sensors to a single camera SoC, (iv) provide low power (e.g., battery) operation, (v) automatically switch sensors on and off to maintain low power operation, (vi) be used in residential settings, (vii) reduce storage (memory) needs/costs, (viii) provide ease of installation, (ix) utilize video analytics to predict target motion, (x) provide seamless tracking from one field of view to another, and/or (xi) be implemented as one or more integrated circuits.

In various embodiments, multi-sensor capabilities of a camera system on chip (SoC) may be utilized to build a battery-powered camera that supports multiple sensors. The multi-sensor camera may be configured to provide surveillance in a corner configuration. In the following description, an example of a camera utilizing two sensors is described for clarity. However, it will be apparent to those skilled in the field of the invention that the number of sensors may easily be extended to more than two sensors.

A corner configuration is generally used where a field of view (FOV) to be covered is greater than about 180 degrees (e.g., 270 degrees, etc.), but less than 360 degrees due to an obstacle (e.g., building wall, etc.). In various embodiments, standard configurations may be made available to fit various residential configurations. In an embodiment with two sensors, both sensors may be connected to a single camera system on chip (SoC) for low power (e.g., battery) operation. In an example embodiment configured to cover two fields of view (FOVs), a first image sensor and a first motion sensor (e.g., passive infrared (PIR) sensor) may be directed in a first direction and a second image sensor and a second motion sensor (e.g., passive infrared (PIR) sensor) may be directed in a second direction, where the second direction is at an angle (e.g., orthogonal) to the first direction. The passive infrared (PIR) sensors generally use very little power.

In an example operation, the first passive infrared (PIR) sensor and the second passive infrared (PIR) sensor may be in an activated state and the first image sensor and the second image sensor may be in a non-activated stated. When someone walks to the driveway, the first passive infrared (PIR) sensor may be triggered. In response to the first PIR sensor being triggered, the camera SoC may turn on the first image sensor and start generating a video stream comprising video captured from the first image sensor. The second image sensor may be left in the non-activated state during this time. When the person walks around the corner, the second passive infrared sensor paired with the second image sensor may be triggered. In response to the second PIR sensor being triggered, the camera SoC may turn on the second image sensor, turn off the first image sensor, and continue generating the video stream using video captured from the second image sensor. In some embodiments, the camera SoC may be configured to blend (or stitch) the video from the two image sensors to provide a smooth (seamless) transition between images of the two cameras. In various embodiments, the video stream generated by the camera SoC may be stored for later playback.

A system in accordance with embodiments of the invention generally provides multiple benefits. A camera user (or manufacturer) may realize reduced cost (e.g., instead of two cameras, one camera and a second sensor and lens may be purchased and installed). Consumers may enjoy easier installation, and lower cost for such installation. A single video recording (file) may be created instead of two video files, lowering storage costs. The recorded video may be naturally "seamless" (e.g., recording movement towards the driveway and then around the corner, etc.). Video analytics may also be run on the camera SoC to predict the direction of the movement and/or reduce false detections. Predicting the direction of motion generally allows the second image sensor to be started ahead of time, to be ready as soon as the moving object of interest is in the field of view of the second image sensor. The video analytics may allow extended battery time by minimizing the amount of time the image sensors are actually active.

Referring to FIG. 1, a diagram is shown illustrating a context in which an example embodiment of the invention may be implemented. In an example, a residential setting may include a house 90. The house 90 may present a number of corner locations. In an example, a camera 100 may be placed at a corner location between a side of the house 90 facing a driveway area and a side of the house 90 facing a side yard or front door pathway. In an example, the camera 100 may be mounted to a soffit of the house 90. In another example, the camera 100 may be mounted to the two walls of the house 90 (e.g., using an angle brackets). The camera 100 may be directed toward an environment adjacent to the sides of the house 90 encompassing the corner location of the camera 100. In an example, the camera 100 may be a battery-powered camera.

In an example embodiment configured to cover two fields of view (FOVs), a first image sensor and a first passive infrared (PIR) sensor may be directed in a first direction and a second image sensor and a second passive infrared (PIR) sensor may be directed in a second direction, where the second direction is at an angle (e.g., orthogonal) to the first direction. The passive infrared (PIR) sensors generally use very little power.

In an example, the camera 100 may be configured to cover two fields of view (FOVs). A first field of view (FOV) may encompass the area including the driveway. A second field of view (FOV) may encompass the area including the side-yard or front-door pathway. In an example, the camera 100 may comprise a first image sensor, a first passive infrared sensor, a second image sensor, a second passive infrared sensor and a camera system on chip (SoC). In an example, the first image sensor and the first passive infrared (PIR) sensor may be directed toward the first field of view and the second image sensor and the second passive infrared sensor may be directed toward the second field of view. The passive infrared (PIR) sensors generally use very little power.

In an example operation, the first passive infrared (PIR) sensor and the second passive infrared (PIR) sensor may be in the activated state and the first image sensor and the second image sensor may be in a non-activated stated. When an object moves to the driveway, the first passive infrared (PIR) sensor may be triggered. In response to the first PIR sensor being triggered, the camera SoC may turn on the first image sensor and start generating a video stream comprising video captured from first image sensor. The second image sensor may be left in the non-activated state during this time. When the object moves around the corner (e.g., towards the front door), the second passive infrared sensor paired with the second image sensor may be triggered. In response to the second PIR sensor being triggered, the camera SoC may turn on the second image sensor, turn off the first image sensor, and continue generating the video stream using video captured from the second image sensor. The camera SoC may be configured to provide a seamless transition between the video captured from the two images sensors.

Figure 2:
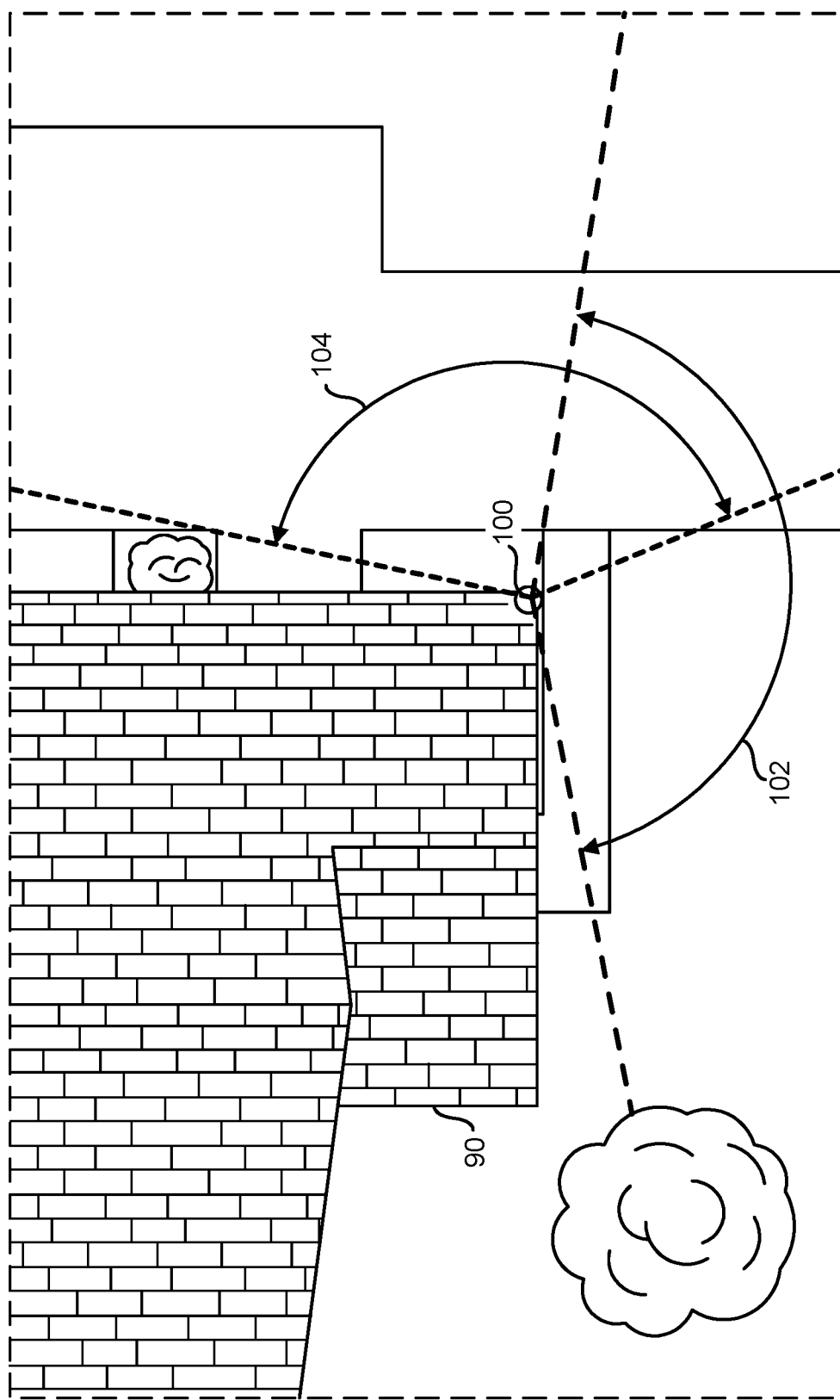
FIG. 2 is a diagram illustrating fields of vision of a camera in accordance with an embodiment of the invention.

Referring to FIG. 2, a diagram is shown illustrating example fields of view (FOVs) of the camera 100 of FIG. 1. In an example, the camera 100 is generally configured to have a first viewing angle 102 for the first field of view and a second viewing angle 104 for the second field of view. The viewing angles 102 and 104 may be wide viewing angles (e.g., less than or substantially equal to 180 degrees). In an example, the two viewing angles 102 and 104 may overlap (e.g., by one or more degrees) at the corner location of the house 90. In an example, the camera 100 may utilize two fisheye lenses to provide the two viewing angles 102 and 104. In various embodiments, the camera 100 may be connected to (or be part of) a home security system.

In an example, the camera 100 may comprise processing circuitry (e.g., the camera SoC) configured to perform a de-warping operation to provide views of particular portions (e.g., right, center, left, etc.) of the two viewing angles 102 and 104. The de-warping operation generally refers to a process of correcting a perspective of an image to reverse effects of geometric distortions (e.g., caused by a camera lens). De-warping may allow the camera 100 to cover the wide viewing angles 102 and 104 (e.g., using fisheye or panoramic lenses), while still having a "normal" view of an otherwise distorted or reversed image. De-warping may also allow the camera 100 to seamlessly combine images captured from the two viewing angles into a single video stream.

Figure 3:
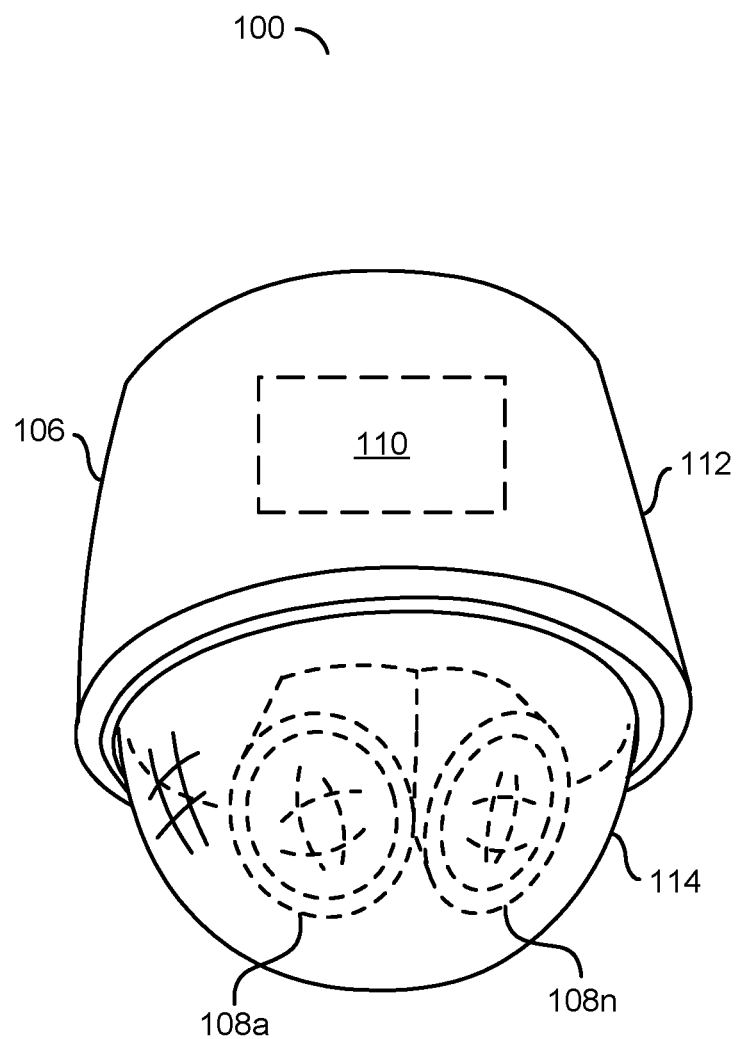
FIG. 3 is a diagram illustrating an example implementation in accordance with an embodiment of the invention.

Referring to FIG. 3, a diagram of the camera 100 is shown illustrating an example implementation in accordance with an example embodiment of the invention. In an example, the camera 100 may comprise a housing 106, a number of blocks (or circuits) 108a-108n, and/or a block (or circuit) 110. The housing 106 may comprise an upper portion 112 and a lower portion 114. The upper portion 112 may be configured to mount the camera 100 to a structure (e.g., a soffit or wall of the house 90). In an example, the lower portion 114 may be implemented as a transparent dome. The housing 106 is generally configured to protect components of the camera 100 from the environment and tampering. The blocks 108a-108n may comprise lens and sensor assemblies. In FIG. 3, a first lens and sensor assembly 108a and a second lens and sensor assembly 108n are shown. The block 110 may comprise a processor (or system-on-chip (SoC)). In various embodiments, the block 110 may implement a camera SoC with multi-sensor capabilities.

In various embodiments, each of the lens and sensor assemblies 108a-108n may have a respective field of view (or viewing angle). In an example, the respective viewing angles of the lens and sensor assemblies 108a-108n may be combined (with or without overlap) to provide a desired number of degrees of coverage for a variety of corner configurations. In an example, two lens and sensor assemblies 108a and 108n may be configured to provide coverage for a 270 degrees field of view (as described above in connection with FIG. 2). For example, the lens and sensor assembly 108a may be configured to observe the viewing angle 102 and the lens and sensor assembly 108n may be configured to observe the viewing angle 104.

The lens and sensor assemblies 108a and 108n may be configured to detect and/or measure various types of input from the environment (e.g., light, motion, heat, sound, smoke, carbon monoxide, Wi-Fi signals, etc.). In an example, each of the lens and sensor assemblies 108a and 108n may comprise a lens assembly, an image sensor, and a motion sensor (described below in connection with FIG. 4). In an example, the motion sensor may be implemented as a passive infrared (PIR) sensor. In another example, the motion sensor may be a smart motion sensor based on vision. In another example, the lens and sensor assemblies 108a and 108n may further comprise a microphone configured to measure audio levels. In another example, a directional microphone may be implemented to allow a location of a noise source to be determined. Other blocks (or circuits or components) of the camera 100 may be implemented. The components of the camera 100 may be varied according to the design criteria of a particular implementation.

The lens and sensor assemblies 108a and 108n may be configured to capture video of respective fields of view. The edges of the field of view of the lens and sensor assembly 108a may be illustrated by the long-dashed lines of the viewing angle 102 in FIG. 2. The edges of the field of view of the lens and sensor assembly 108n may be illustrated by the short-dashed lines of the viewing angle 104 in FIG. 2. In an example, the fields of view of the lens and sensor assemblies 108a and 108n may overlap. The range of the fields of view provided by the viewing angles 102 and 104 may be varied according to the design criteria of a particular implementation.

Each of the lens and sensor assemblies 108a and 108n may be directed towards a location in the overall field of view of the camera 100. Each of the lens and sensor assemblies 108a and 108n may provide coverage for a portion of the field of view of the camera 100. In an example, the lens and sensor assembly 108a may provide coverage for the viewing angle 102. In another example, the lens and sensor assembly 108n may provide coverage for the viewing angle 104. The portion of coverage of each of the lens and sensor assemblies 108a and 108n may be a zone. In an example, a first zone may cover the viewing angle 102 and be covered by the lens and sensor assembly 108a. In another example, a second zone may cover the viewing angle 104 and be covered by the lens and sensor assembly 108n. In yet another example, additional zones may cover portions of the field of view of the camera 100 and be covered by respective ones of a number of lens and sensor assemblies 108a-108n. While the viewing angles 102 and 104 are shown overlapping, in some embodiments the zones covered by the lens and sensor assemblies 108a-108n may be configured so as to not overlap. The number, size and/or arrangement of the zones may be varied according to the design criteria of a particular implementation.

Figure 4:
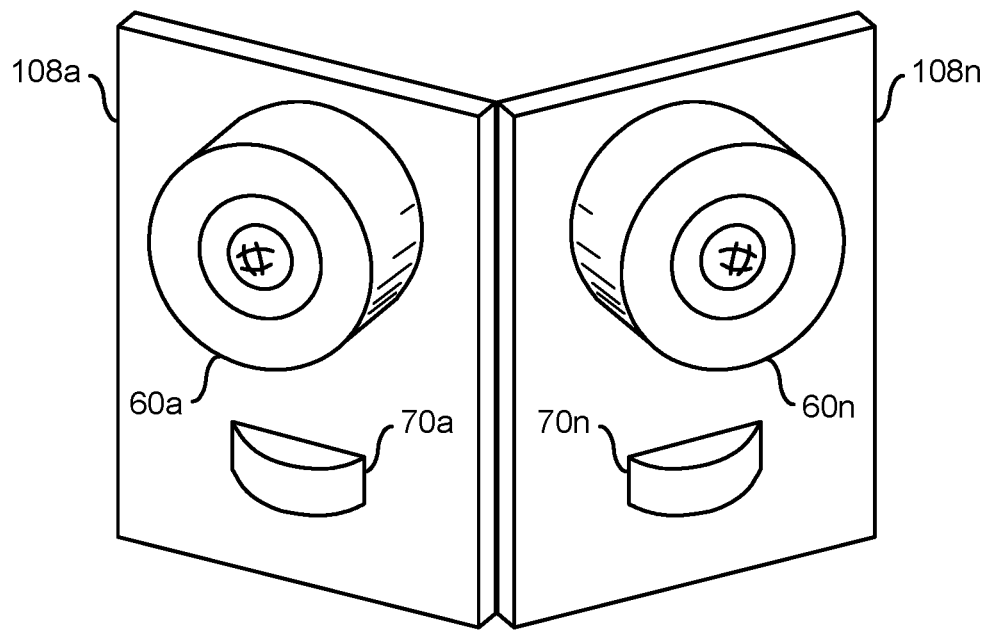
FIG. 4 is a diagram illustrating components of an example implementation in accordance with an embodiment of the invention.
Figure 4:
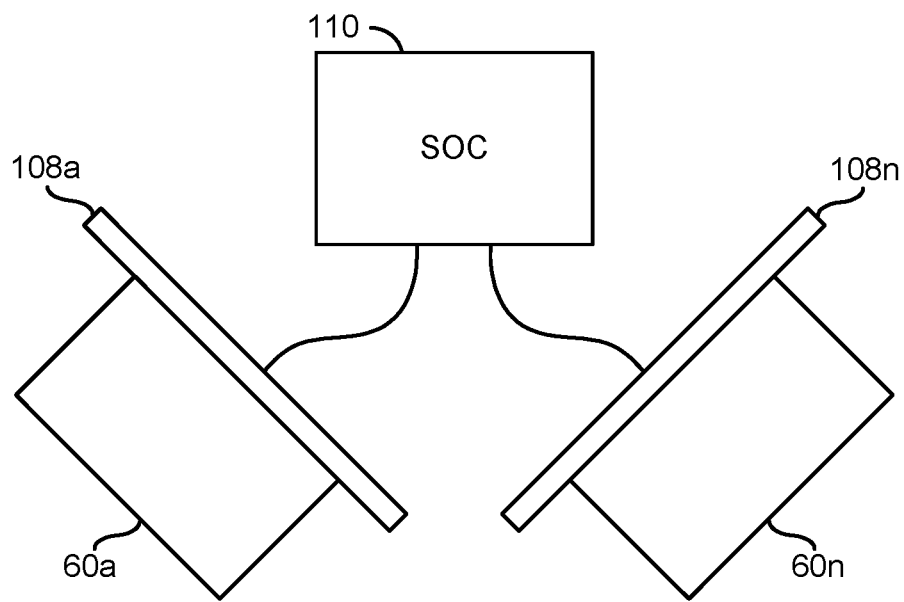

Referring to FIG. 4, a diagram is shown illustrating an example implementation of a camera in accordance with an example embodiment of the invention. In an example, each of the lens and sensor assemblies 108a-108n may comprise a lens assembly 60a-60n, a motion sensor 70a-70n, and an image sensor 80a-80n (not shown). The lens and sensor assemblies 108a-108n may be arranged such that optical axes of the lens assemblies 60a-60n are at an angle to one another. In an example implementing two lens and sensor assemblies, the optical axes may be at an angle of 90 degrees to one another.

In various embodiments, each of the lens and sensor assemblies 108a-108n is generally connected to a single processor or system on chip (SoC) 110 by one or more buses.

In an example, the lens and sensor assemblies 108a-108n may be connected to the processor or system on chip (SoC) 110 using one or more serial buses (e.g., I²C, SPI, etc.), parallel buses (e.g. GPIO, etc.), and/or individual signals (e.g., via wires or traces). In various embodiments, the lens and sensor assemblies 108a-108n may communicate video image streams and motion detection signals to the processor or system on chip (SoC) 110, and the processor or system on chip (SoC) 110 may communicate control signals to the lens and sensor assemblies 108a-108n.

Figure 5:
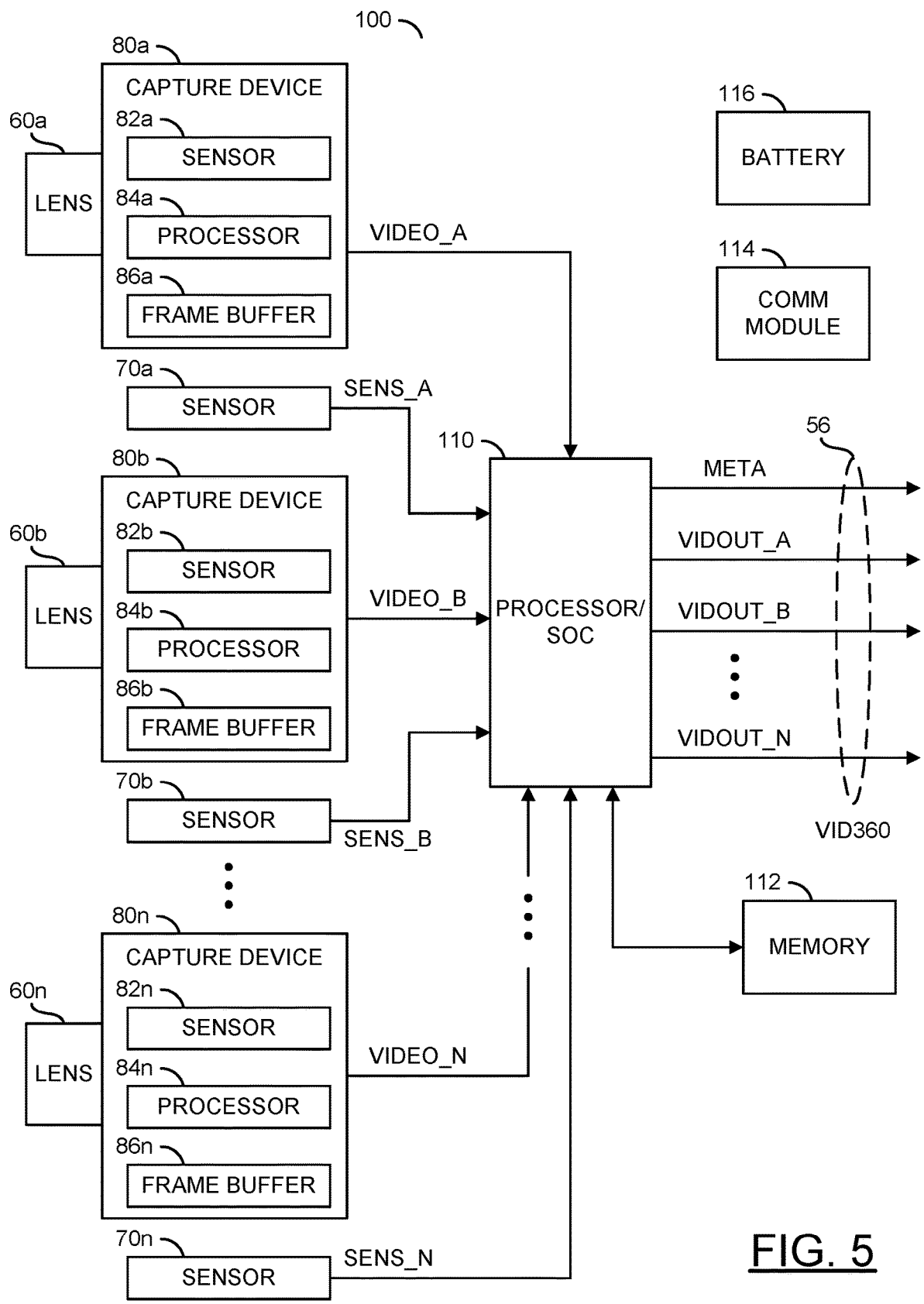
FIG. 5 is a diagram of an example processing circuit.

Referring to FIG. 5, a block diagram of the camera 100 is shown illustrating a camera system-on-a-chip connected to multiple lens and sensor assemblies 108a-108n. The camera 100 may comprise the lenses 60a-60n, the motion sensors 70a-70n, the image sensors 80a-80n, the SoC 110, a block (or circuit) 112, a block (or circuit) 114, and/or a block (or circuit) 116. The circuit 112 may be implemented as a memory. The block 114 may be a communication module. The block 116 may be implemented as a battery. In some embodiments, the camera 100 may comprise the lenses 60a-60n, the motion sensors 70a-70n, the image sensors 80a-80n, the SoC 110, the memory 112, the communication module 114, and the battery 116. In another example, the camera 100 may comprise the lenses 60a-60n, the motion sensors 70a-70n, and the capture devices 80a-80n, and the SoC 110, the memory 112, the communication module 114, and the battery 116 may be components of a separate device. The implementation of the camera 100 may be varied according to the design criteria of a particular implementation.

The lenses 60a-60n are shown attached to respective capture devices 80a-80n. In an example, the capture devices 80a-80n are shown respectively comprising blocks (or circuits) 82a-82n, blocks (or circuits) 84a-84n and blocks (or circuits) 86a-86n. The circuits 82a-82n may be sensors (e.g., image sensors). The circuits 84a-84n may be processors and/or logic. The circuits 86a-86n may be memory circuits (e.g., frame buffers).

The capture devices 80a-80n may be configured to capture video image data (e.g., light collected and focused by the lenses 60a-60n). The capture devices 80a-80n may capture data received through the lenses 60a-60n to generate a video bitstream (e.g., a sequence of video frames). The lenses 60a-60n may be directed, tilted, panned, zoomed and/or rotated to capture the environment surrounding the camera 100 (e.g., capture data from the fields of view).

The capture devices 80a-80n may transform the received light into a digital data stream. In some embodiments, the capture devices 80a-80n may perform an analog to digital conversion. For example, the capture devices 80a-80n may perform a photoelectric conversion of the light received by the lenses 60a-60n. The image sensors 80-80n may transform the digital data stream into a video data stream (or bitstream), a video file, and/or a number of video frames. In an example, each of the capture devices 80a-80n may present the video data as a digital video signal (e.g., the signals VIDEO_A-VIDEO_N). The digital video signals may comprise the video frames (e.g., sequential digital images and/or audio).

The video data captured by the capture devices 80a-80n may be represented as signals/bitstreams/data VIDEO_A-VIDEO_N (e.g., a digital video signal). The capture devices 80a-80n may present the signals VIDEO_A-VIDEO_N to the processor/SoC 110. The signals VIDEO_A-VIDEO_N may represent the video frames/video data. The signals VIDEO_A-VIDEO_N may be video streams captured by the capture devices 80a-80n.

The image sensors 82a-82n may receive light from the respective lenses 60a-60n and transform the light into digital data (e.g., the bitstream). For example, the image sensors 82a-82n may perform a photoelectric conversion of the light from the lenses 60a-60n. In some embodiments, the image sensors 82a-82n may have extra margins that are not used as part of the image output. In some embodiments, the image sensors 82a-82n may not have extra margins. In some embodiments, some of the image sensors 82a-82n may have the extra margins and some of the image sensors 82a-82n may not have the extra margins. In some embodiments, the image sensors 82a-82n may be configured to generate monochrome (B/W) video signals. In some embodiments, the image sensors 82a-82n may be configured to generate color (e.g., RGB, YUV, RGB-IR, YCbCr, etc.) video signals. In some embodiments, the image sensors 82a-82n may be configured to generate video signals in response to visible and/or infrared (IR) light.

The processor/logic 84a-84n may transform the bitstream into a human viewable content (e.g., video data that may be understandable to an average person regardless of image quality, such as the video frames). For example, the processors 84a-84n may receive pure (e.g., raw) data from the camera sensors 82a-82n and generate (e.g., encode) video data (e.g., the bitstream) based on the raw data. The capture devices 80a-80n may have the memory 86a-86n to store the raw data and/or the processed bitstream. For example, the capture devices 80a-80n may implement the frame memory and/or buffers 86a-86n to store (e.g., provide temporary storage and/or cache) one or more of the video frames (e.g., the digital video signal). In some embodiments, the processors/logic 84a-84n may perform analysis and/or correction on the video frames stored in the memory/buffers 86a-86n of the capture devices 80a-80n.

The motion sensors 70a-70n may be configured to detect motion (e.g., in the fields of view corresponding to the viewing angles 102 and 104). The detection of motion may be used as one threshold for activating the capture devices 80a-80n. The motion sensors 70a-70n may be implemented as internal components of the camera 100 and/or as components external to the camera 100. In an example, the sensors 70a-70n may be implemented as passive infrared (PIR) sensors. In another example, the sensors 70a-70n may be implemented as smart motion sensors. In an example, the smart motion sensors may comprise low resolution image sensors configured to detect motion and/or persons. The motion sensors 70a-70n may each generate a respective signal (e.g., SENS_A-SENS_N) in response to motion being detected in one of the respective zones (e.g., FOVs 102 and 104). The signals SENS_A-SENS_N may be presented to the processor/SoC 110. In an example, the motion sensor 70a may generate (assert) the signal SENS_A when motion is detected in the FOV 102 and the motion sensor 70n may generate (assert) the signal SENS_N when motion is detected in the FOV 104.

The processor/SoC 110 may be configured to execute computer readable code and/or process information. The processor/SoC 110 may be configured to receive input and/or present output to the memory 112. The processor/SoC 110 may be configured to present and/or receive other signals (not shown). The number and/or types of inputs and/or outputs of the processor/SoC 110 may be varied according to the design criteria of a particular implementation. The processor/SoC 110 may be configured for low power (e.g., battery) operation.

The processor/SoC 110 may receive the signals VIDEO_A-VIDEO_N and the signals SENS_A-SENS_N. The processor/SoC 110 may generate a signal META based on the signals VIDEO_A-VIDEO_N, the signals SENS_A-SENS_N, and/or other input. In some embodiments, the signal META may be generated based on analysis of the signals VIDEO_A-VIDEO_N and/or objects detected in the signals VIDEO_A-VIDEO_N. In various embodiments, the processor/SoC 110 may be configured to perform one or more of feature extraction, object detection, object tracking, and object identification. For example, the processor/SoC 110 may determine motion information by analyzing a frame from the signals VIDEO_A-VIDEO_N and comparing the frame to a previous frame. The comparison may be used to perform digital motion estimation.

In some embodiments, the processor/SoC 110 may perform video stitching operations. The video stitching operations may be configured to facilitate seamless tracking as objects move through the fields of view associated with the capture devices 80a-80n. The processor/SoC 110 may generate a number of signals VIDOUT_A-VIDOUT_N. The signals VIDOUT_A-VIDOUT_N may be portions (components) of a multi-sensor video signal. In some embodiments, the processor/SoC 110 may be configured to generate a single video output signal (e.g., VIDOUT). The video output signal(s) (e.g., VIDOUT or VIDOUT_A-VIDOUT_N) may be generated comprising video data from one or more of the signals VIDEO_A-VIDEO_N. The video output signal(s) (e.g., VIDOUT or VIDOUT_A-VIDOUT_N) may be presented to the memory 112 and/or the communications module 114.

The memory 112 may store data. The memory 112 may be implemented as a cache, flash memory, memory card, DRAM memory, etc. The type and/or size of the memory 112 may be varied according to the design criteria of a particular implementation. The data stored in the memory 112 may correspond to a video file, motion information (e.g., readings from the sensors 70a-70n, video stitching parameters, image stabilization parameters, user inputs, etc.) and/or metadata information.

The lenses 60a-60n (e.g., camera lenses) may be directed to provide a view of an environment surrounding the camera 100. The lenses 60a-60n may be aimed to capture environmental data (e.g., light). The lenses 60a-60n may be wide-angle lenses and/or fish-eye lenses (e.g., lenses capable of capturing a wide field of view). The lenses 60a-60n may be configured to capture and/or focus the light for the capture devices 80a-80n. Generally, the image sensors 82a-82n are located behind the lenses 60a-60n. Based on the captured light from the lenses 60a-60n, the capture devices 80a-80n may generate bitstreams and/or video data.

The communications module 114 may be configured to implement one or more communications protocols. For example, the communications module 114 may be configured to implement Wi-Fi, Bluetooth, Ethernet, etc. In embodiments where the camera 100 is implemented as a wireless camera, the protocol implemented by the communications module 114 may be a wireless communications protocol. The type of communications protocols implemented by the communications module 114 may be varied according to the design criteria of a particular implementation.

The communications module 114 may be configured to generate a broadcast signal as an output from the camera 100. The broadcast signal may send the video data VIDOUT to external devices. For example, the broadcast signal may be sent to a cloud storage service (e.g., a storage service capable of scaling on demand). In some embodiments, the communications module 114 may not transmit data until the processor/SoC 110 has performed video analytics to determine that an object is in the field of view of the camera 100.

In some embodiments, the communications module 114 may be configured to generate the manual control signal. The manual control signal may be generated in response to a signal from a user received by the communications module 114. The manual control signal may be configured to activate the processor/SoC 110. The processor/SoC 110 may be activated in response to the manual control signal regardless of the power state of the camera 100.

The camera 100 may include a battery 116 configured to provide power for the various components of the camera 100. The multi-step approach to activating and/or disabling the capture devices 80a-80n based on the outputs of the motion sensors 70a-70n and/or any other power consuming features of the camera 100 may be implemented to reduce a power consumption of the camera 100 and extend an operational lifetime of the battery 116. The motion sensors 70a-70n may have a very low drain on the battery 116 (e.g., less than 10 W). In an example, the motion sensors 70a-70n may be configured to remain on (e.g., always active) unless disabled in response to feedback from the processor/SoC 110. The video analytics performed by the processor/SoC 110 may have a large drain on the battery 116 (e.g., greater than the motion sensors 70a-70n). In an example, the processor/SoC 110 may be in a low-power state (or power-down) until some motion is detected by the motion sensors 70a-70b.

The camera 100 may be configured to operate using various power states. For example, in the power-down state (e.g., a sleep state, a low-power state) the motion sensors 70a-70n and the processor/SoC 110 may be on and other components of the camera 100 (e.g., the image capture devices 80a-80n, the memory 112, the communications module 114, etc.) may be off. In another example, the camera 100 may operate in an intermediate state. In the intermediate state, one of the image capture devices 80a-80n may be on and the memory 112 and/or the communications module 114 may be off. In yet another example, the camera 100 may operate in a power-on (or high power) state. In the power-on state, the motion sensors 70a-70n, the processor/SoC 110, the capture devices 80a-80n, the memory 112 and/or the communications module 114 may be on. The camera 100 may consume some power from the battery 116 in the power-down state (e.g., a relatively small and/or minimal amount of power). The camera 100 may consume more power from the battery 116 in the power-on state. The number of power states and/or the components of the camera 100 that are on while the camera 100 operates in each of the power states may be varied according to the design criteria of a particular implementation.

Figure 6:
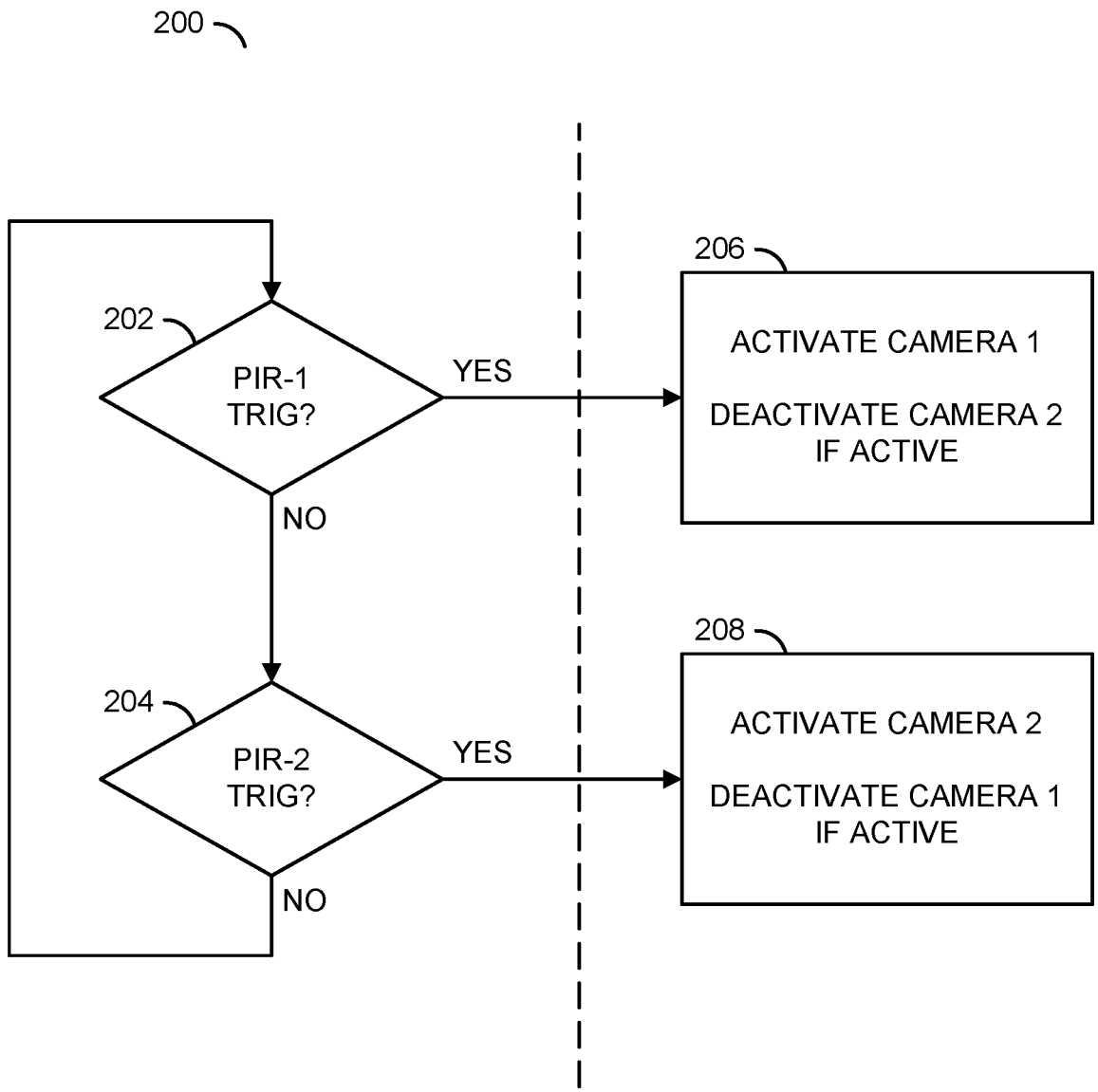
FIG. 6 is a diagram illustrating a process in accordance with an example embodiment of the invention.

Referring to FIG. 6, a diagram is shown illustrating a process in accordance with an example embodiment of the invention. In an example, a method (or process) 200 may be performed using the camera 100. The method 200 may detect motion within a monitored area and provide a video record of the object in motion detected. The method 200 generally comprises a decision step (or state) 202, a decision step (or state) 204, a step (or state) 206, and a step (or state) 208.

The process 200 may start in either the decision state 202 or the decision state 204. In the decision state 202, the processor 110 may determine whether a first motion sensor (e.g., PIR-1) has been triggered. If the first motion sensor PIR-1 has not been triggered, the process 200 may move to the decision state 204. If the first motion sensor PIR-1 has been triggered, the process 200 may move to the state 206.

In the decision state 204, the processor 110 may determine whether a second motion sensor (e.g., PIR-2) has been triggered. If the second motion sensor PIR-2 has not been triggered, the process 200 may move to the decision state 202. If the second motion sensor PIR-2 has been triggered, the process 200 may move to the state 208. The process 200 may loop through the decision states 202 and 204 until either the first or the second motion sensor is triggered.

In the state 206, the processor 110 may activate a first image sensor (e.g., CAMERA 1) corresponding to the first motion sensor and record video. If the camera 100 is in a low power mode, the processor 110 may determine whether a second camera (e.g., CAMERA 2) associated with the second motion sensor is on and, if so, deactivate the second camera.

In the state 208, the processor 110 may activate the second image sensor (e.g., CAMERA 2) corresponding to the second motion sensor and record video. If the camera 100 is in a low power mode, the processor 110 may determine whether the first camera (e.g., CAMERA 1) associated with the first motion sensor is on and, if so, deactivate the first camera.

In various embodiments, the processor 110 may perform video analytics on the video being recorded to try to anticipate the motion of the moving object being tracked. The processor 110 may be configured to control the activation and deactivation of various image sensors in order to maintain a seamless video recording of the motion of the object in the area being monitored by the camera 100.

Figure 7A:
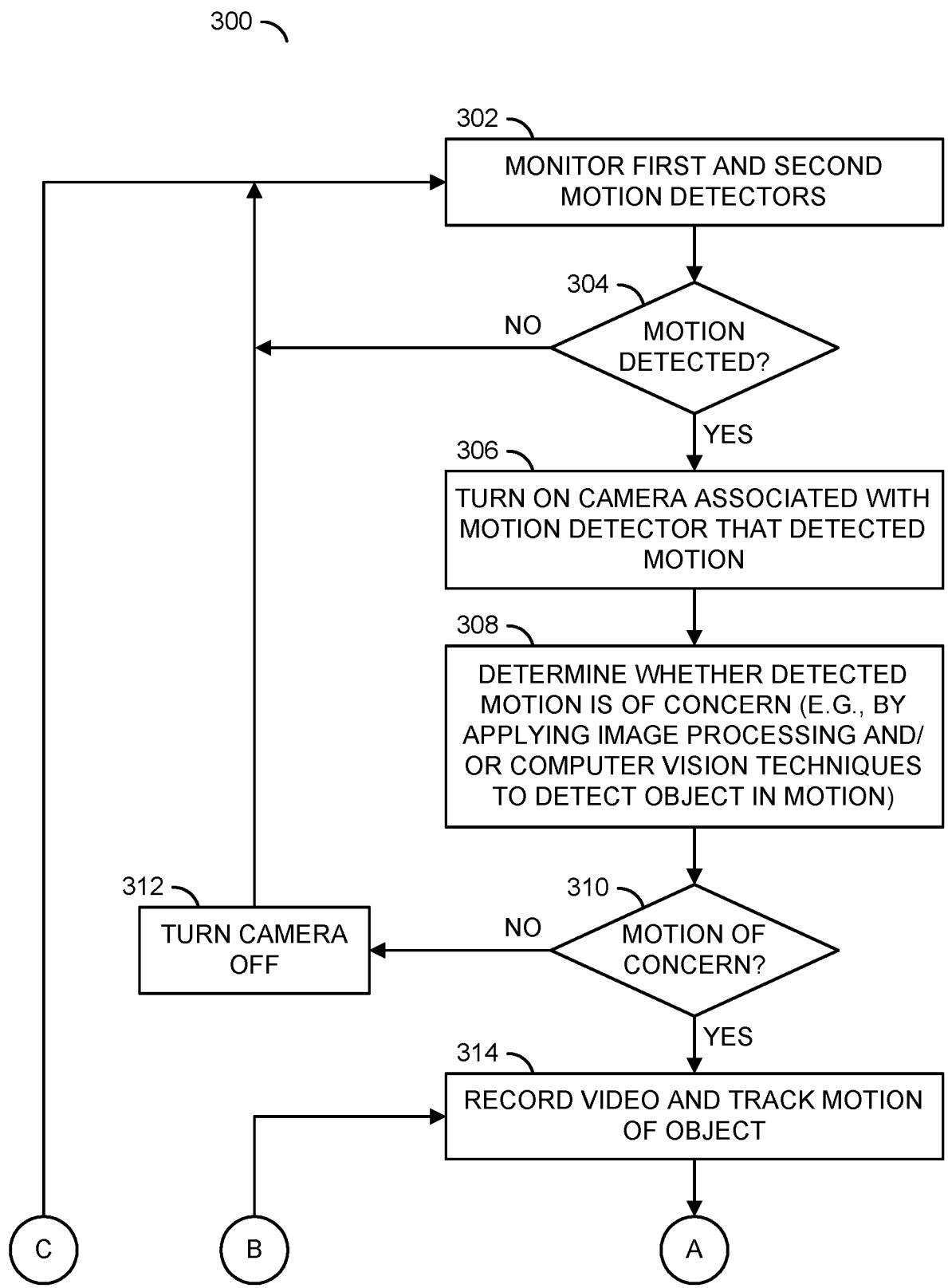
FIGS. 7A-7B are a diagram illustrating another example process in accordance with an example embodiment of the invention.
Figure 7B:
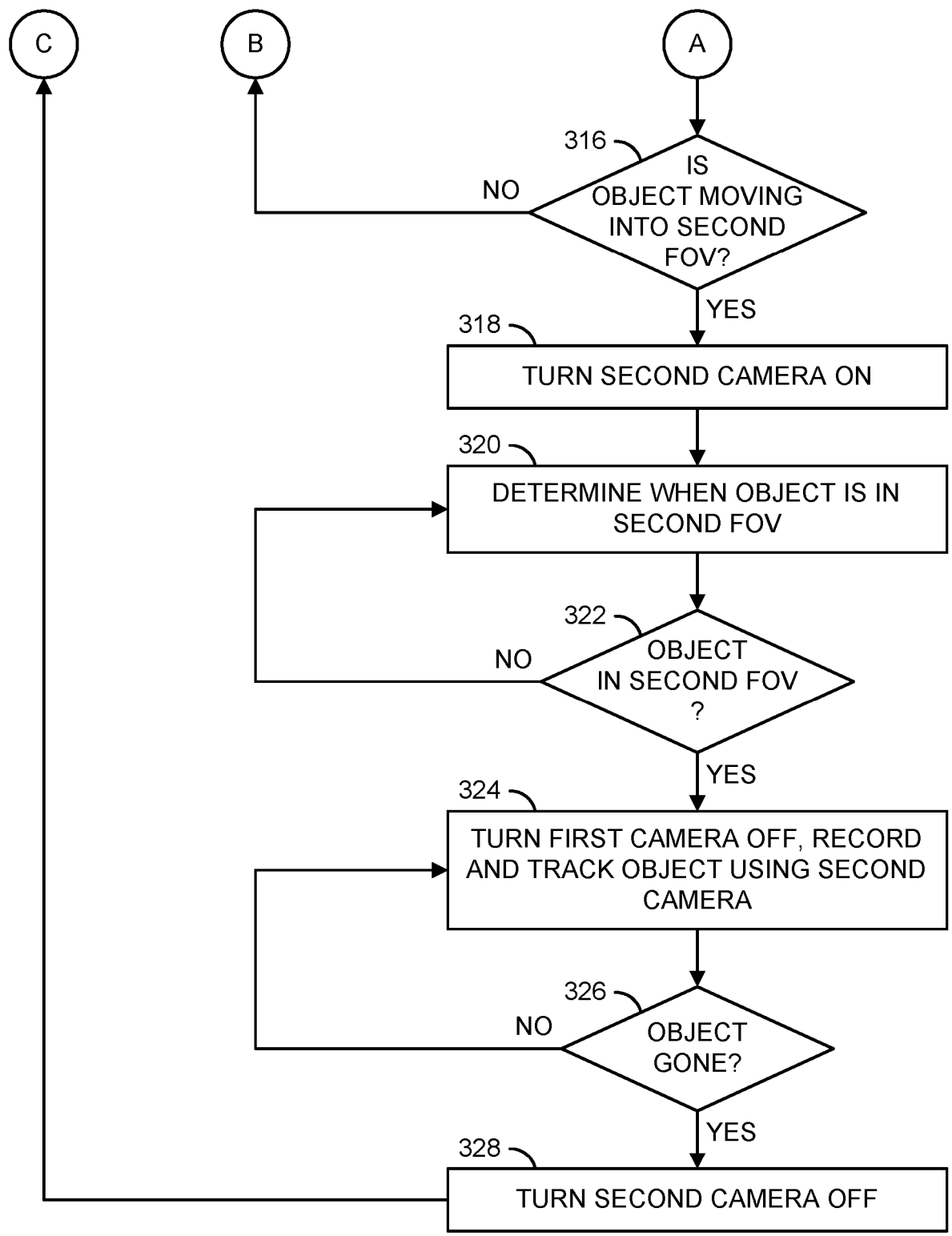

Referring to FIGS. 7A-7B, a diagram is shown illustrating another example process in accordance with an example embodiment of the invention. In an example, a method (or process) 300 may be performed using the camera 100. The method 300 may detect motion within a monitored area and provide a video record of an object associated with the motion detected. In an example, the method 300 may comprise a step (or state) 302, a decision step (or state) 304, a step (or state) 306, a step (or state) 308, a decision step (or state) 310, a step (or state) 312, a step (or state) 314, a decision step (or state) 316, a step (or state) 318, a step (or state) 320, a decision step (or state) 322, a step (or state) 324, a decision step (or state) 326, and a step (or state) 328.

The process 300 may start in the state 302. In the state 302, the processor 110 may monitor a first motion sensor and a second motion sensor to detect motion in a monitored area. The first motion sensor may be associated with a first image sensor having a first field of view. The second motion sensor may be associated with a second image sensor having a second field of view. Together, the first field of view and the second field of view may cover an area around a corner of a structure (e.g., a house, etc.). In an example, the first and the second fields of view may overlap by one or more degrees. In the decision state 304, the processor 110 may determine whether one of the motion detectors has been triggered. If the motion sensors have not been triggered, the process 300 may move to the state 302 and continue monitoring the motion sensors. If the one of the motion sensors has been triggered, the process 300 may move to the state 306. In the state 306, the processor 110 may turn on the image sensor associated with the motion sensor that was triggered and move to the state 308. In the state 308, the processor 110 may determine whether the motion detected was caused by an object to be tracked. In an example, the processor 110 may perform one or more image processing and/or computer vision operations or techniques (e.g., feature extraction, object detection, object identification, etc.) to determine whether the detected motion is associated with an object of concern (e.g., vehicle, person, etc.) or an object that may be ignored (e.g., small animal, bird, rain, etc.).

In the decision step 310, if the processor 110 determines the object may be ignored, the process 300 may move to the state 312. If the processor 110 determines the motion is associated with an object of concern, the process 300 may move to the state 314. In the state 312, the processor 110 may turn off the image sensor and move to the state 302 to resume monitoring the motion sensors. In the state 314, the processor 110 may begin generating a sequence of video images comprising video from the image sensor that is switched on (or activated) and track motion of the object (e.g., using the one or more computer vision operations or techniques). In the decision state 316, the process 300 may determine whether the object in motion is moving from a current field of view (e.g., the field of view of the activated image sensor) to another field of view. If the object is not moving into another field of view, the process 300 may loop in the states 314 and 316. If the object is moving into another field of view, the process 300 may move to the state 318.

In the state 318, the processor 110 may turn on the image sensor corresponding to the field of view into which the object is moving and move the state 320. In the state 320, the processor 110 may determine whether the object is actually in the second field of view using the one or more image processing and/or computer vision operations or techniques (e.g., feature extraction, object detection, object identification, etc.). In the decision state 322, if the object is not in the second field of view, the process 300 may return to the state 320. When the object is confirmed to be in the second field of view, the process 300 may move to the state 324. In the state 324, the processor 110 may turn off the first image sensor and begin generating the sequence of video images comprising video from the second image sensor. The processor 110 may also continue tracking the object. In the decision state 326, the processor 110 may determine whether the object has left the second field of view. If the object has not left the second field of view, the process 300 may loop through the states 324 and 326. When the object has left the second field of view, the process 300 may move to the state 328. In the state 328, processor 110 may turn the second image sensor off and the process 300 moves to the state 302. In an example where the object begins moving toward the first field of view, the process 300 may perform steps similar to the steps 314 through 328 with the first image sensor.

In various embodiments, the processor 110 may perform video analytics on the video being recorded to try to anticipate the motion of the moving object being tracked. The processor 110 may be configured to control the activation and deactivation of various image sensors in order to maintain a seamless video recording of the motion of the object in the area being monitored by the camera 100, while minimizing the amount of power utilized for extended battery life. In various embodiments, the processor 110 may be configured for low power operation. In an example, the processor 110 may comprise one or more dedicated hardware circuits (or engines or circuitry) implementing various image processing steps and/or computer vision operations.

The functions and structures illustrated in the diagrams of FIGS. 1 to 7 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
a housing;
a first lens and first image sensor disposed within said housing and configured to capture a first video image stream of a first field of view (FOV);
a second lens and second image sensor disposed within said housing and configured to capture a second video image stream of a second FOV;
a first motion sensor disposed within said housing and configured to detect motion in said first FOV;
a second motion sensor disposed within said housing and configured to detect motion in said second FOV; and
a camera system on chip (SOC) with multi-sensor capabilities disposed within said housing and coupled to said first image sensor, said first motion sensor, said second image sensor, and said second motion sensor, wherein a processor of said camera system on chip (SOC) is configured to generate a third video image stream in response to one or more of said first video image stream and said second video image stream.

2. The apparatus according to claim 1, wherein said first lens and said first image sensor are mounted orthogonally relative to said second lens and said second image sensor.

3. The apparatus according to claim 1, wherein said first FOV and said second FOV overlap by one or more degrees.

4. The apparatus according to claim 1, wherein said processor is further configured to track an object moving from the first or the second FOV to the second or the first FOV.

5. The apparatus according to claim 4, wherein said processor is further configured to switch said first and said second image sensors on and off as said object moves from the first or the second FOV to the second or the first FOV.

6. The apparatus according to claim 5, wherein said processor is further configured to utilize video analytics to determine when to switch said first and said second image sensors on and off as said object moves from the first or the second FOV to the second or the first FOV.

7. The apparatus according to claim 6, wherein said processor is further configured to switch said first image sensor or said second image sensor on prior to said object moving from the first or the second FOV to the second or the first FOV, and switch said first image sensor or said second image sensor off after said object has moved from the second or the first FOV to the first or the second FOV.

8. The apparatus according to claim 1, wherein each of said first motion sensor and said second motion sensor comprises a passive infrared (PIR) sensor.

9. The apparatus according to claim 1, wherein each of said first motion sensor and said second motion sensor comprises a low resolution image sensor configured to detect at least one of motion and a person.

10. The apparatus according to claim 1, wherein said processor is further configured to determine when to switch said first and said second image sensors on and off based on inputs from said first motion sensor and said second motion sensor.

11. The apparatus according to claim 1, wherein said apparatus is battery powered.

12. The apparatus according to claim 1, wherein said processor is configured to communicate said third video image stream to a monitoring device using a wireless protocol.

13. The apparatus according to claim 1, wherein said processor performs video analytics to predict a direction of movement of an object to allow said first or said second image sensor to be started ahead of time, to be ready as soon as the object is in the first FOV or the second FOV.

14. A method of monitoring an area using a camera system on chip (SOC) with multi-sensor capabilities, said method comprising:
orienting a first lens and a first image sensor disposed within a housing containing said camera SoC to capture a first video image stream of a first field of view (FOV);
orienting a second lens and a second image sensor disposed within said housing containing said camera SoC to capture a second video image stream of a second FOV;
orienting a first motion sensor disposed within said housing containing said camera SoC and associated with said first image sensor to detect motion in said first FOV;
orienting a second motion sensor disposed within said housing containing said camera SoC and associated with said second image sensor to detect motion in said second FOV; and
generating a third video image stream in response to one or more of said first video image stream and said second video image stream using a processor of said camera SoC coupled to said first image sensor, said first motion sensor, said second image sensor, and said second motion sensor.

15. The method according to claim 14, wherein said first lens and said first image sensor are mounted orthogonally relative to said second lens and said second image sensor.

16. The method according to claim 14, wherein said first FOV and said second FOV overlap by one or more degrees.

17. The method according to claim 14, further comprising:
using said processor to track an object moving from the first or the second FOV to the second or the first FOV; and
switching said first and said second image sensors on and off as said object moves from the first or the second FOV to the second or the first FOV.

18. The method according to claim 17, wherein said processor utilizes video analytics to determine when to switch said first and said second image sensors on and off as said object moves from the first or the second FOV to the second or the first FOV.

19. The method according to claim 18, wherein said processor is further configured to switch said first image sensor or said second image sensor on prior to said object moving from the first or the second FOV to the second or the first FOV, and switch said first image sensor or said second image sensor off after said object has moved from the second or the first FOV to the first or the second FOV.

20. The method according to claim 14, wherein each of said first motion sensor and said second motion sensor comprises at least one of a passive infrared (PIR) sensor and a low resolution image sensor configured to detect at least one of motion and a person.

* * * * *